United States Patent
Nanchung et al.

(10) Patent No.: US 12,435,433 B2
(45) Date of Patent: Oct. 7, 2025

(54) METHODS AND SYSTEMS FOR MONITORING ELECTROCHEMICAL CELL PERFORMANCE AND CLEANING METAL IONS FROM PROTON EXCHANGE MEMBRANE WATER ELECTROLYZERS

(71) Applicant: ELECTRIC HYDROGEN CO., Natick, MA (US)

(72) Inventors: Tenzin Nanchung, Somerville, MA (US); David Eaglesham, Lexington, MA (US)

(73) Assignee: ELECTRIC HYDROGEN CO., Devens, MA (US)

( * ) Notice: Subject to any disclaimer, the term of this patent is extended or adjusted under 35 U.S.C. 154(b) by 0 days.

(21) Appl. No.: 18/703,599

(22) PCT Filed: Feb. 3, 2023

(86) PCT No.: PCT/US2023/012281
§ 371 (c)(1),
(2) Date: Apr. 22, 2024

(87) PCT Pub. No.: WO2023/150270
PCT Pub. Date: Aug. 10, 2023

(65) Prior Publication Data
US 2024/0337032 A1    Oct. 10, 2024

Related U.S. Application Data

(60) Provisional application No. 63/306,592, filed on Feb. 4, 2022.

(51) Int. Cl.
*C25B 15/00*     (2006.01)
*B08B 3/08*     (2006.01)
(Continued)

(52) U.S. Cl.
CPC ............. *C25B 15/00* (2013.01); *B08B 3/08* (2013.01); *C11D 7/265* (2013.01); *C25B 9/77* (2021.01)

(58) Field of Classification Search
CPC .. C25B 9/77; C25B 15/00; B08B 3/08; C11D 7/265
See application file for complete search history.

(56) References Cited

U.S. PATENT DOCUMENTS

| | | |
|---|---|---|
| 2005/0197743 A1 | 9/2005 | Rusta-Sallehy et al. |
| 2009/0127212 A1 | 5/2009 | Muller et al. |

(Continued)

FOREIGN PATENT DOCUMENTS

| | | | | |
|---|---|---|---|---|
| EP | 3628757 A1 | * | 4/2020 | ............. C25B 15/00 |
| JP | 0456794 A | * | 2/1992 | |

(Continued)

OTHER PUBLICATIONS

Machine translation of JP04-56794A (Year: 1992).*
International Search Report and Written Opinion for PCT/US2023/012281, dated Jun. 27, 2023, pp. 1-10.

*Primary Examiner* — Douglas Lee
(74) *Attorney, Agent, or Firm* — Lempia Summerfield Katz LLC

(57) ABSTRACT

The following disclosure relates to electrochemical or electrolysis cells and components thereof. More specifically, the following disclosure relates methods and systems for removing metal ions from a membrane of an electrochemical cell by introduction of a cleaning composition (e.g., an acidic composition) into a water supply to the electrochemical cell. These systems and methods for removal of metal ions from the membrane(s) of the electrochemical cell(s) may advantageously extend the efficiency and service life of the electrochemical cell or stack.

14 Claims, 6 Drawing Sheets

(51) Int. Cl.
*C11D 7/26* (2006.01)
*C25B 9/77* (2021.01)

(56) References Cited

U.S. PATENT DOCUMENTS

| | | | |
|---|---|---|---|
| 2010/0187127 A1* | 7/2010 | Zhou | B01D 61/52 204/295 |
| 2010/0273071 A1 | 10/2010 | Yoshida et al. | |
| 2012/0276466 A1* | 11/2012 | Sinha | H01M 8/04582 429/430 |
| 2014/0027288 A1 | 1/2014 | Nyberg et al. | |
| 2014/0363751 A1* | 12/2014 | Blanchet | G01R 31/3842 324/426 |
| 2022/0033986 A1 | 2/2022 | Gubler et al. | |

FOREIGN PATENT DOCUMENTS

| | | |
|---|---|---|
| KR | 1020160016967 A | 2/2016 |
| KR | 101882807 B1 | 8/2018 |

\* cited by examiner

METHODS AND SYSTEMS FOR MONITORING ELECTROCHEMICAL CELL PERFORMANCE AND CLEANING METAL IONS FROM PROTON EXCHANGE MEMBRANE WATER ELECTROLYZERS

This application is a § 371 nationalization of PCT Application Serial No. PCT/US2023/012281, filed Feb. 3, 2023, designating the United States, which claims the benefit of U.S. Provisional Patent Application No. 63/306,592, filed Feb. 4, 2022, which are incorporated by reference in their entireties.

FIELD

The following disclosure relates to cleaning metal ions from proton exchange membranes.

BACKGROUND

Electrolyzer systems use electrical energy to drive a chemical reaction. For example, water is split to form hydrogen and oxygen. The products may be used as energy sources for later use. In recent years, improvements in operational efficiency have made electrolyzer systems competitive market solutions for energy storage, generation, and/or transport. For example, the cost of generation may be below $10 per kilogram of hydrogen in some cases. Increases in efficiency and/or improvements in operation will continue to drive installation of electrolyzer systems.

Performance of a proton exchange membrane for water electrolyzers (PEMWE) depends on many factors, for example, water quality. Metal ions in the water become trapped inside pores of the membrane and reduce the efficiency of water splitting in the cell.

SUMMARY

In one embodiment, a method of cleaning metal ions from a membrane of an electrochemical cell is provided. The method includes adding a cleaning composition to a water source supplied to the electrochemical cell; reacting the cleaning composition with the metal ions at the membrane of the electrochemical cell; and transferring a product of the reaction of the cleaning composition and the metal ions from the membrane and the electrochemical cell, therein removing at least a portion of the metal ions from the membrane of the electrochemical cell.

In another embodiment, a method of monitoring an operational performance of a membrane of an electrochemical cell is provided. The method includes measuring, by a voltage sensor, a first operational voltage of the electrochemical cell at a first time; measuring, by the voltage sensor, a second operational voltage of the electrochemical cell at a second time; calculating, by a processor, a change in operational voltage of the electrochemical cell over a period of time defined by a difference between the first operational voltage and the second operational voltage divided by a difference between the first time and the second time; comparing, by the processor, the change in the operational voltage to a threshold value; and providing, by the processor, a notification or alarm when the change in the operational voltage equals or exceeds the threshold value.

In yet another embodiment, an electrochemical system is provided. The system includes at least one electrochemical cell; at least one voltage sensor configured to measure a first operational voltage of a respective electrochemical cell of the at least one electrochemical cell at a first time and measure a second operational voltage of the electrochemical cell at a second time; and a processor configured to: receive the measured first operational voltage at the first time and the second operational voltage at the second time from the at least one voltage sensor; calculate a change in operational voltage of the respective electrochemical cell over a period of time defined a difference between the first operational voltage and the second operational voltage divided by a difference between the first time and the second time; compare the change in the operational voltage to a threshold value; and provide a notification or alarm when the change in the operational voltage equals or exceeds the threshold value. In some examples, the system is further configured to provide an instruction to add or inject a cleaning composition to a water source supplied to the at least one electrochemical cell to remove metal ions at a membrane of the at least one electrochemical cell.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Exemplary embodiments are described herein with reference to the following drawings.

DETAILED DESCRIPTION

Figure 1:
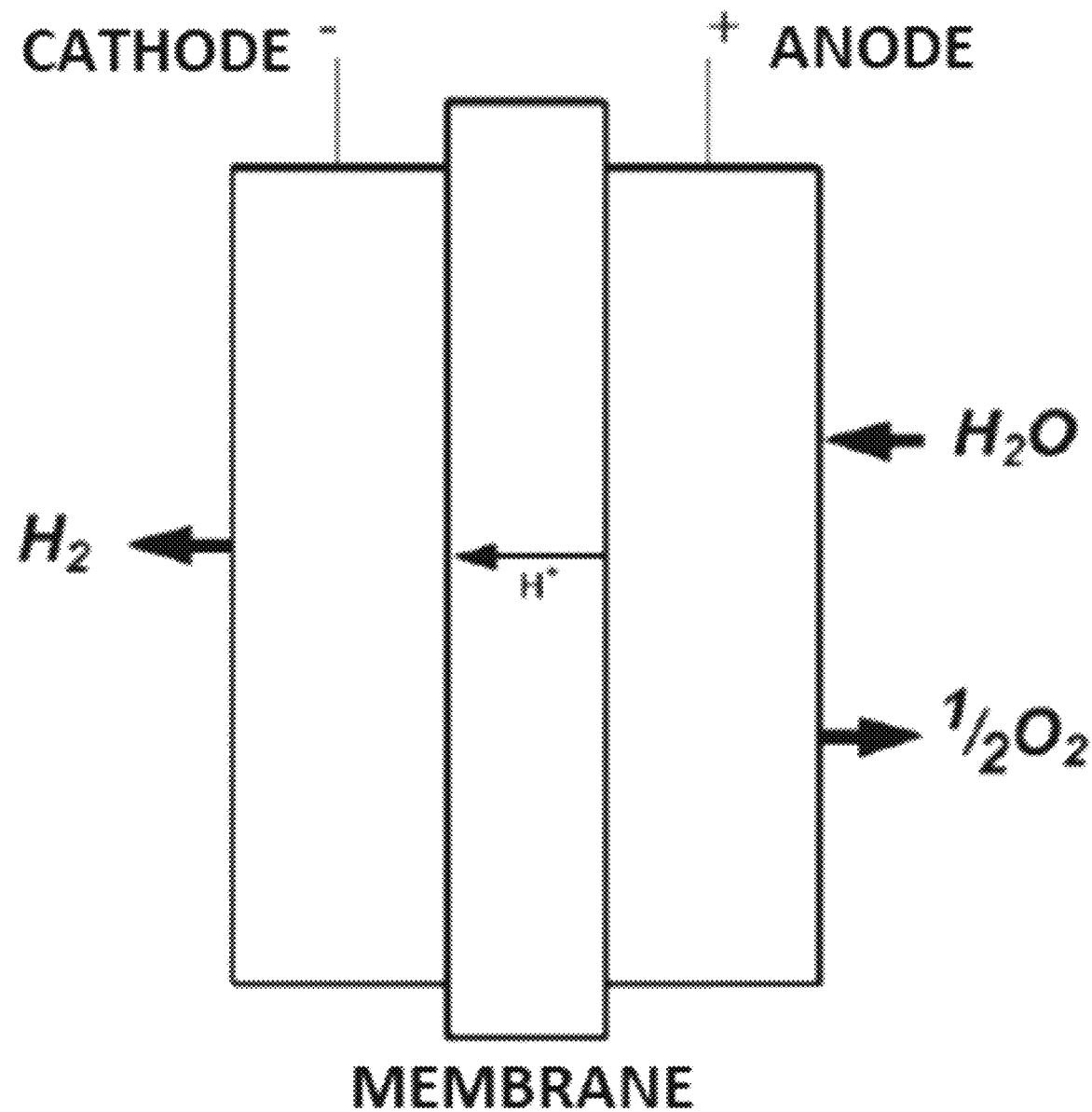
FIG. 1 depicts an example of an electrolytic cell.

FIG. 1 depicts an example of an electrolytic cell for the production of hydrogen gas and oxygen gas through the splitting of water. The electrolytic cell includes a cathode, an anode, and a membrane positioned between the cathode and anode. Within the water splitting electrolysis reaction, one interface runs an oxygen evolution reaction (OER) while the other interface runs a hydrogen evolution reaction (HER). For example, the anode reaction is $H_2O \rightarrow 2H^+ + \frac{1}{2}O_2 + 2e$ and the cathode reaction is $2H^+ + 2e \rightarrow H_2$. The water electrolysis reaction has recently assumed great importance and renewed attention as a potential foundation for a decarbonized "hydrogen economy."

Electrolytic cells may include additional components/layers positioned between the electrodes of the cell. For example, the cell may include a porous transport layer (PTL) or a gas diffusion layer (GDL) positioned between an electrode (e.g., cathode or anode) and the membrane. In certain examples, the membrane within the electrolytic cell may be referred to as a proton exchange membrane for water electrolyzers (PEMWE).

Figure 2:
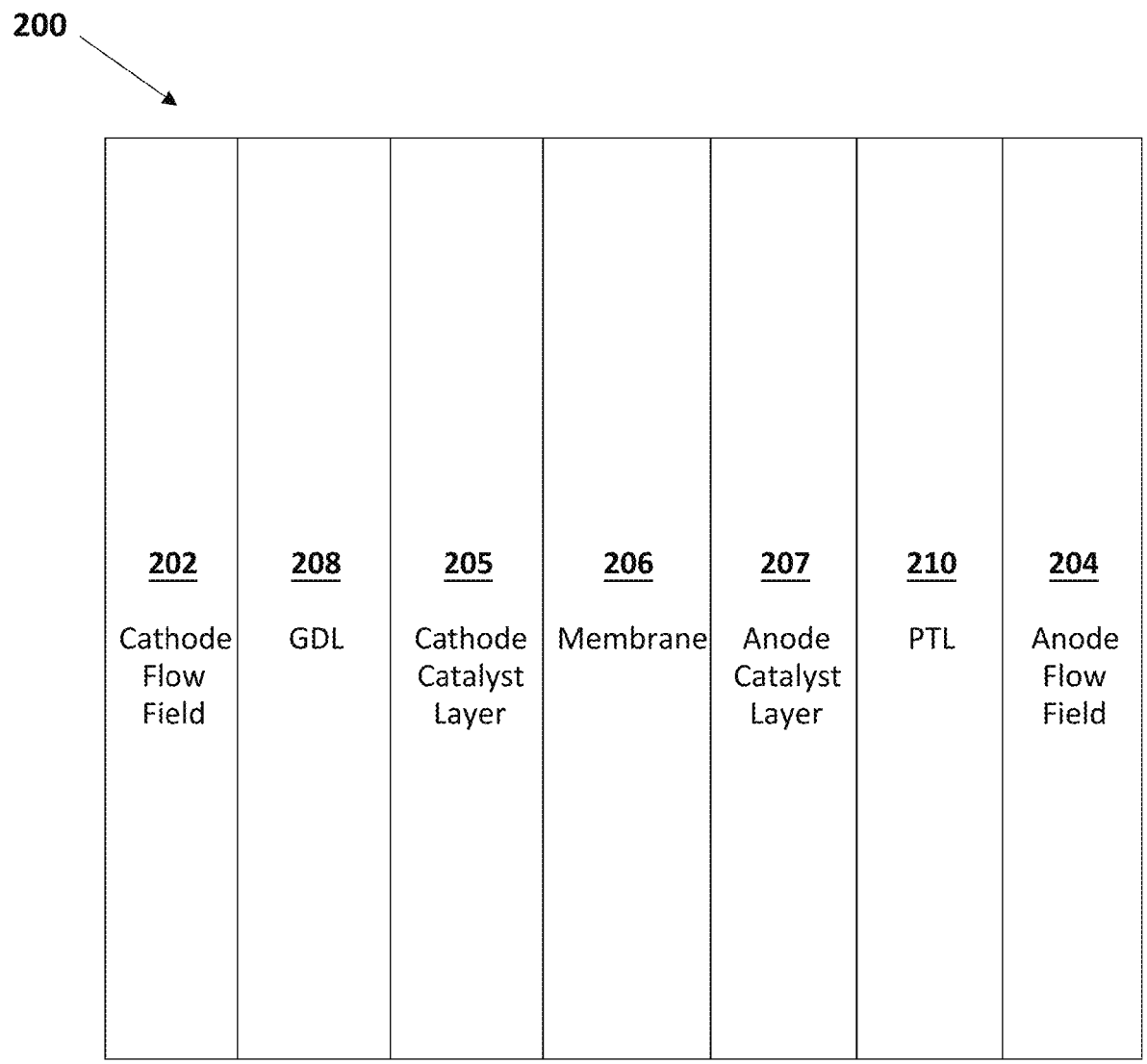
FIG. 2 depicts an additional example of an electrochemical or electrolytic cell.

FIG. 2 depicts an additional example of an electrochemical or electrolytic cell. Specifically, FIG. 2 depicts a portion of an electrochemical cell 200 having a cathode flow field 202, an anode flow field 204, and a membrane 206 positioned between the cathode flow field 202 and the anode flow field 204. In certain examples, the membrane 206 may have an overall thickness that is less than 1000 microns, 500 microns, 100 microns, 50 microns, 10 microns, etc.

In certain examples, additional layers may be present within the electrochemical cell 200. For example, one or more additional layers 208 may be positioned between the cathode flow field 202 and membrane 206. In certain examples, this may include a gas diffusion layer (GDL) 208 may be positioned between the cathode flow field 202 and membrane 206. This may be advantageous in providing a hydrogen diffusion barrier adjacent to the cathode on one side of the multi-layered membrane to mitigate hydrogen crossover to the anode side. In other words, the GDL is responsible for the transport of gaseous hydrogen to the cathode side flow field. For a wet cathode PEM operation, liquid water transport across the GDL is needed for heat removal in addition to heat removal from the anode side.

In certain examples, the GDL is made from a carbon paper or woven carbon fabrics. The GDL is configured to allow the flow of hydrogen gas to pass through it. The thickness of the GDL may be within a range of 100-1000 microns, for example. As used herein, a "thickness" by which is film is characterized refers to the distance, or median measured distance, between the top and bottom faces of a film in a direction perpendicular to the plane of the film layer. As used herein, the top and bottom faces of a film refer to the sides of the film extending in a parallel direction of the plane of the film having the largest surface area.

Similarly, one or more additional layers 210 may be present in the electrochemical cell between the membrane 206 and the anode 204. In certain examples, this may include a porous transport layer (PTL) positioned between the membrane 206 (e.g., the anode catalyst layer 207 of the catalyst coated membrane 206) and the anode flow field 204.

In certain examples, the PTL is made from a titanium (Ti) mesh/felt. As used herein, a Ti mesh/felt may refer to a structure created from microporous Ti fibers. The Ti felt structure may be sintered together by fusing some of the fibers together. Ti felt may be made by a special laying process and a special ultra-high temperature vacuum sintering process. The Ti felt may have an excellent three-dimensional network, porous structure, high porosity, large surface area, uniform pore size distribution, special pressure, and corrosion resistance, and may be rolled and processed.

Similar to the GDL, the PTL is configured to allow the transportation of the reactant water to the anode catalyst layers, remove produced oxygen gas, and provide good electrical conductivity for effective electron conduction. In other words, liquid water flowing in the anode flow field is configured to permeate through the PTL to reach the CCM. Further, gaseous byproduct oxygen is configured to be removed from the PTL to the flow fields. In such an arrangement, liquid water functions as both reactant and coolant on the anode side of the cell.

The thickness of the PTL may be within a range of 100-1000 microns, for example. The thickness may affect the mass transport within the cell as well as the durability/deformability and electrical/thermal conductivity of the PTL. In other words, a thinner PTLs compared to thicker PTLs (e.g., 1 mm) may provide better mass transport. However, when the PTL is too thin (e.g., less than 100 microns), the PTL may suffer from poor two phase flow effects as well. PTLs are less prone to deformation compared to GDLs. Thickness of PTLs may also affect lateral electron conduction resistance along the lands in between channels.

In some examples, an anode catalyst coating layer may be positioned between the anode 204 and the PTL.

The cathode 202 and anode 204 of the cell may individually include a flow field plate composed of metal, carbon, or a composite material having a set of channels machined, stamped, or etched into the plate to allow fluids to flow inward toward the membrane or out of the cell.

Since the performance of a single electrolytic cell may not be adequate for many use cases, multiple cells may be placed together to form a "stack" of cells, which may be referred to as an electrolyzer stack, electrolytic stack, electrochemical stack, or simply just a stack. In one example, a stack may contain 50-1000 cells, 50-100 cells, 500-700 cells, or more than 1000 cells. Any number of cells may make up a stack.

Figure 3:
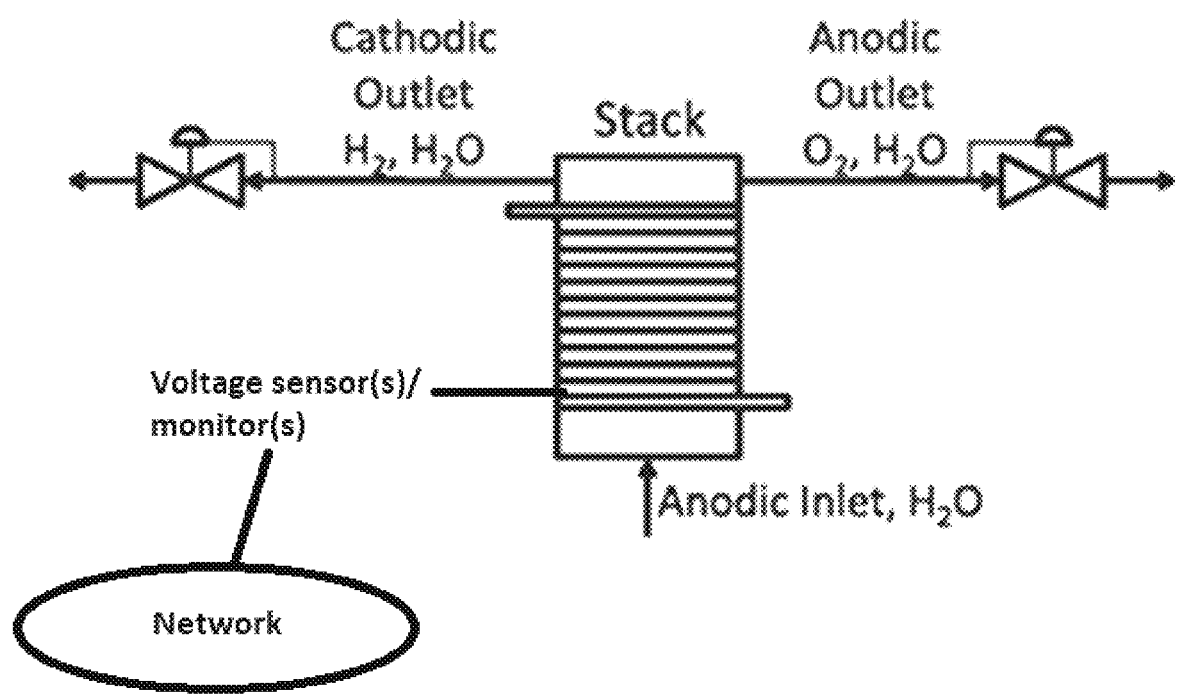
FIG. 3 depicts an example of a section of a system having an electrolytic stack.

FIG. 3 depicts an example of a portion of electrolysis system for producing hydrogen gas and oxygen gas from water. The system includes a stack including a plurality of electrochemical or electrolytic cells, such as the cells of FIG. 1 or FIG. 2. The stack is configured to receive water through an anodic inlet. The system further includes a cathodic outlet at an outlet of the stack. The cathodic outlet transfers the hydrogen gas produced from the electrolytic cells to further downstream components for further processing. In certain configurations, a water byproduct is also provided at the cathodic outlet (wherein the water may be used as a coolant for the hydrogen gas produced). Additional downstream components following the cathodic outlet are not depicted, but may include water-gas separators, purifiers, heat exchangers, circulation pumps, pressure regulators, etc. In FIG. 3, a cathodic pressure regulator is depicted at the cathodic outlet. This pressure regulator may be positioned further downstream from the cathodic outlet after one or more further components such as a water-gas separator or purifier but is depicted at the particular location in FIG. 3 for simplicity.

Further, the electrolysis system includes an anodic outlet that transfers the oxygen gas produced from the electrochemical cells within the stack as well as unreacted water byproduct to further downstream components for further processing. Again, the additional downstream components following the anodic outlet are not depicted, but may include water-gas separators, purifiers, heat exchangers, circulation pumps, pressure regulators, etc. In FIG. 3, an anodic pressure regulator is depicted at the anodic outlet. This pressure regulator may be positioned further downstream from the anodic outlet after one or more further components such as a water-gas separator or purifier but is depicted at the particular location in FIG. 3 for simplicity.

In certain examples, the electrolysis system downstream of the anodic outlet includes one or more separator units configured to separate one or more of the metal ions, acidic-metal compounds, salts, or unreacted cleaning compositions within the anodic outlet stream that are flushed away from the membrane in the cleaning process described in greater detail below.

In another embodiment, an arrangement is provided with multiple cell stacks in series/parallel.

As depicted in FIG. 3, the electrolysis system further includes at least one voltage sensor or monitor configured to measure the operational voltage of a specific cell, group of cells, or stack within the system. The voltage sensor may be configured to transmit the measured voltage (and time of recording) to a monitoring system associated with the electrolysis system. This signal transfer may occur over a connected network between the electrochemical cell/stack and the associated monitoring system.

As noted above in FIG. 1 and FIG. 2, each cell includes a membrane positioned between and separating the anode and cathode sides of the cell. The membrane within each electrolytic cell may be referred to as a proton exchange membrane for water electrolyzers (PEMWE).

PEMWE performance relies on various factors, one of them being water quality. In certain examples, metal ions from the water may become trapped inside pores of the membrane. These trapped metal ions may reduce the efficiency of water splitting. For example, as the metal ions accumulate at the membrane, the voltage required to perform electrolysis in the cell may increase over time. This accumulation may occur with membranes made from perfluorosulfonic acid and/or polytetrafluoroethylene (such as a Nafion™ membrane) or other materials. The increase in voltage caused by the accumulation of metal ions may be greater over time than is expected, typical, or within the specification for a cell without metal accumulation.

As such, there is a need to clean the PEMWE membrane (e.g., in situ) to allow to improve performance of the cell as well as extend the lifetime of the cell and/or stack having a plurality of cells. The following disclosure provide such examples of in situ membrane cleaning to advantageously maintain or improve the membrane water splitting performance characteristics and/or extend the life of the cell/stack.

PEMWE membranes may trap metal ions due to the high proton affinity. Metal ion accumulation at the membrane may cause cascading or compounding problems that significantly accelerate performance loss. For example, the concentration of metal ions present at the membrane may increase due to additional leaching events over the course of the useful life of the cell. In certain examples, metal ions may enter the water stream during a leaching event. Leaching may occur from metal dissolution of pipes and other components (e.g., water heaters tanks) on a plant or system level. Leaching may also occur from degradation of cell components, such as a bipolar plate, and, more rapidly, a porous transport layer (e.g., because the layer is close to an acidic membrane). During leaching, ions including Fe, Al, Cu, or other elements may enter the water when an electrode or other part of the electrolytic cell is compromised. In the case of Fe ions entering the water, a reaction according to Fenton's reagent may occur. The Fe ions in solution may cause oxidation of organic compounds, such as those present in the membrane, thereby causing unzipping of the membrane and leading to membrane thinning.

As a result of such metal ion deposition or reaction at the membrane, the membrane may degrade and become thinner over time. Eventually, the damage to the membrane caused by Fenton's reagent or a reaction of other metal ions may result in a soft short circuit (e.g., a partial or minor short circuit) or a hard short circuit (a complete short circuit) between an anode and cathode in the cell, reducing performance of the cell or rendering the cell incapable of carrying out the electrolysis/water splitting reaction. Additionally, or alternatively, metal ions in the water may bind to electrons produced during electrolysis, thereby reducing the electrons available for electrolysis and reducing performance of the cell. Because the electrolytic process does not remove or dilute metal ions, the negative effects on electrolysis performance may also increase over time.

As such, methods for cleaning or removing metal ions from the membrane of an electrochemical or electrolytic cell are needed.

Figure 4:
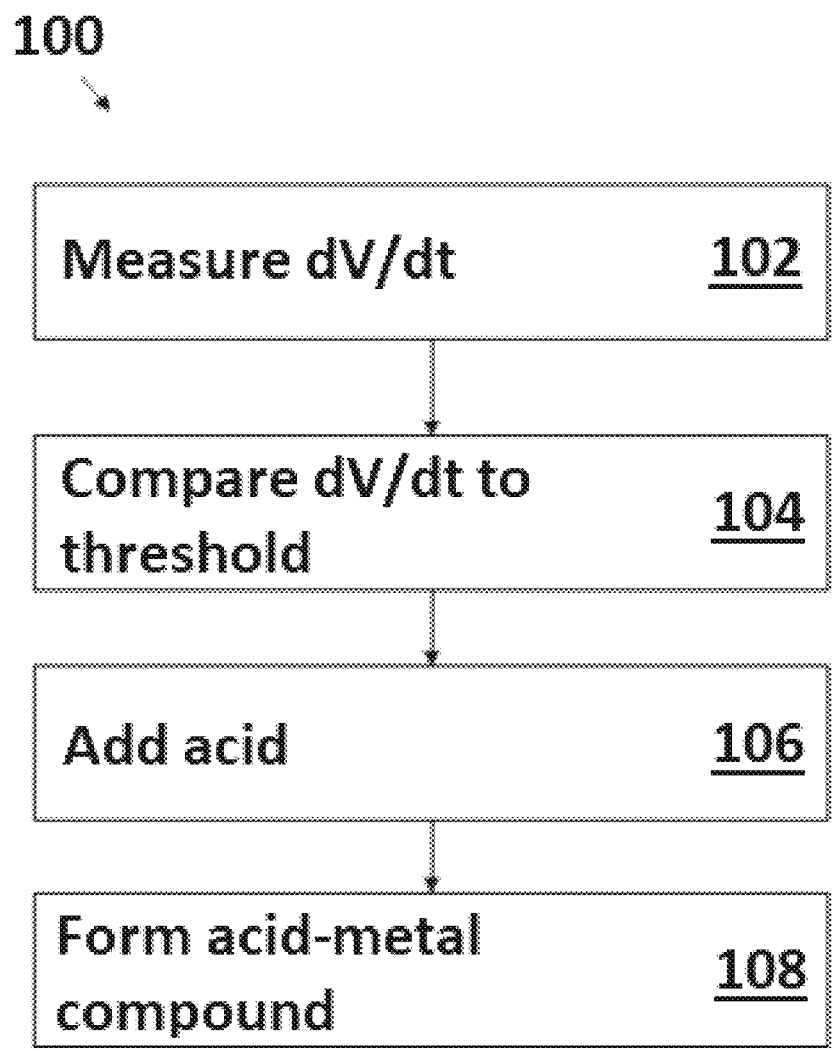
FIG. 4 depicts an example of a flowchart of a method of in situ membrane metal ion cleaning.

FIG. 4 depicts an example of a flowchart of a method for in situ membrane metal ion cleaning of an electrochemical cell (such as a water electrolyzer cell), or a stack of cells. The method advantageously increases the performance and service lifetime of the cell or stack. In certain examples, one or more of the acts of FIG. 4 may be skipped or omitted. For example, acts 102 and/or 104 may be omitted. In other examples, additional acts may be included in the process of cleaning the cell/stack in situ.

In act 102, data for the operating voltage may be measured or received over a period of time for an individual cell, one or more groups of a plurality of cells less than all of the cells within the electrochemical stack, or all of the cells within the electrochemical stack. For example, a first voltage measurement for a particular cell, group of cells, or stack may be recorded at a first time, and a second voltage measurement for the same cell, group of cells, or stack may be recorded at a second time.

In certain examples, the electrolysis system (such as depicted in FIG. 3) includes one or more sensors or voltage monitors configured to retrieve or monitor the operating voltage(s) of one or more cells or group of cells within the stack at a specific period of time. The monitored voltage(s) may be transferred to a memory or database within the electrolysis system or external from the electrolysis system for further processing. Specifically, voltage measurements over a period of time may be processed by a processor or controller within the electrolysis system or external from the electrolysis system.

In some examples, in act 102, the processor or controller may calculate, measure, or identify a change in voltage over time (dV/dt) within the cell, a group of cells, or all of the cells in the electrochemical stack based on a difference between the two measurements recorded divided by the difference between the first and second times. The period of time between voltage measurements for the dV/dt calculation may be predefined for a specific period of time, e.g., 1 minute, 5 minutes, 10 minutes, 15 minutes, 30 minutes, 1 hour, 2 hours, etc. Alternatively, an operator of the electrochemical system may view the voltage data collected and select (e.g., enter via an input device of the electrochemical system) a specific time period for analysis.

In certain examples, this may include calculating an average dV/dt taken from multiple voltage monitors within the cell or cell stack. In some examples, this dV/dt calculation may be weighted in favor of certain voltage monitors over other voltage monitors within the cell stack, e.g., based on the measurement location of the specific sensors or monitors within the stack.

In act 104, the determined change in voltage within a specific cell, group/plurality of cells, or the entire cell stack may be compared to a threshold dV/dt value. For example, the threshold value may be determined or predefined from a specification, design, or expected performance of the electrolytic cell or stack over a period of time. For example, a change in voltage over a period of time that equals or exceeds the predefined threshold value may indicate a problem with the operation of the electrolytic cell, plurality of cells, or stack. This operational problem may indicate that metal ion accumulation at the membrane has begun or is worsening and degrading the efficiency of electrolysis at the identified cell, plurality of cells, or stack. Therefore, when the calculated dV/dt reaches or exceeds such a predefined threshold, an intervention may be triggered. This intervention may include providing an indication to an operator to conduct an (e.g., in situ) cleansing of the accumulated metal ions at the membrane within a window of operation of the cell. Alternatively, the intervention may include providing a signal or instruction to the electrochemical system to automatically clean the membrane to remove the buildup of metal ions at a specific time.

In other words, the timing of the cleaning process may be determined based on deviation from a specified or predefined change in voltage over time for the cell or stack. During the useful life of an electrolytic cell, the efficiency of the electrolysis process may decrease over time, leading to a higher minimum voltage required for the electrolysis reaction to take place. Below this minimum voltage, electrolysis may not occur. Beyond a regular or expected degradation in performance of the membrane over time and the associated increase in minimum voltage over time to account for this expected membrane performance degradation, the accumulation of metal ions may more quickly and more significantly reduce efficiency of electrolysis. For example, in a new cell, a voltage V1 is a minimum voltage at which electrolysis occurs. Over time as electrolysis is performed using the cell, a voltage V2 that is greater than V1 may be the minimum voltage at which electrolysis occurs. As a result, a cell that has metal ions accumulated at a membrane may have a greater change (i.e., increase) in the required operational voltage over time than is specified or expected.

In act 106, a cleaning agent or composition is added to the water stream to remove the buildup of metal ions at the membrane (e.g., within pores of the membrane) to advantageously extend the life and improve the performance of the membrane. In certain examples, the cleaning composition is added to the inlet water stream or source that is supplied to the cell or stack for the water splitting reaction. For example, the cleaning composition may be added to the water that is supplied to the anodic inlet of the stack of cells, as depicted in FIG. 3.

In certain examples, the cleaning composition is a composition configured to react with the metal ions to form an acidic-metal compound or salt within the water stream that is flushed away from the membrane and subsequently removed from the electrolysis system. The cleaning composition may be an acidic composition or solution.

In certain examples, the acidic composition or solution is provided or prepared at a specific pH to clean the membrane of metal ions during electrolysis. Because the membrane may be cleaned during operation, the cleaning may advantageously be performed in situ, without disassembly of the cell. In certain examples, the in situ cleaning process may be performed during the standard operation of the electrochemical cell or stack, wherein the acidic composition is injected or added to the water inlet with the remaining operational variables remaining the same. Alternatively, the in situ cleaning process may be performed during a shutdown or during a startup of the cell or stack, wherein a product stream including the generated acidic-metal or salt compounds is diverted from a typical downstream separation process.

In one example, the acidic composition may include an acid such as selenic acid, sulfuric acid, hydroiodic acid, hydrobromic acid, hydrochloric acid, nitric acid, orthophosphoric acid, arsenic acid, selenous acid, chromic acid, citric acid, hydrofluoric acid, nitrous acid, isocyanic acid, formic acid, hydrogen selenide, molybdic acid, lactic acid, acetic acid, carbonic acid, hydrogen sulfide, arsenious acid, hydrocyanic acid, boric acid, silicic acid, or a combination thereof. In one particular example, the acidic composition includes citric acid.

In certain examples, the pH of the acidic composition is in a range of 1-7, in a range of 2-6, or in a range of 3-5. The pH and specific composition for the acidic composition may be chosen based on the ability to react with and/or remove the metal ions from the membrane without affecting other characteristics of the electrochemical system. Specifically, certain acidic compositions at certain pH levels may disadvantageously result in leaching other metals into the water solution and damage sensitive elements of the cell, stack, or overall system.

In act 108, the added cleaning composition reacts with the metal ions at the membrane, wherein an acid-metal compound is formed and subsequently removed from the membrane. In certain examples where the cleaning composition added to the water supply is citric acid, the metal-organic compound or complex formed may include ferric citrate or another combination of citric acid and metal ions.

By adding the cleaning composition (e.g., an acid composition) to the cell or stack of cells, the metal ions trapped in the membrane are advantageously freed from the pores of the cell membrane. In certain examples, the acid-metal compound is transferred out from the membrane on the anode side of the cell with the generated oxygen and water byproduct. Separation of the acid-metal compound from the oxygen and water can occur downstream in one or more separation units. Removal of these trapped ions may significantly increase cell/stack life by reducing the dV/dt required to operate the cell/stack and prevent the compounding effect of metal ion leeching into and damaging the membrane.

In some examples, the process may be repeated immediately or a predetermined time period wherein further operational voltage readings are collected from the cell/stack to determine if the operational problem has been alleviated (e.g., if the operational dV/dt has been reduced below the threshold value to an expected operational value for the cell/stack). In some cases, to the extent the operational problem remains present, a further cleaning sequence may be initiated. This process could continue until the measured voltage and calculated dV/dt are at an acceptable level.

Figure 5:
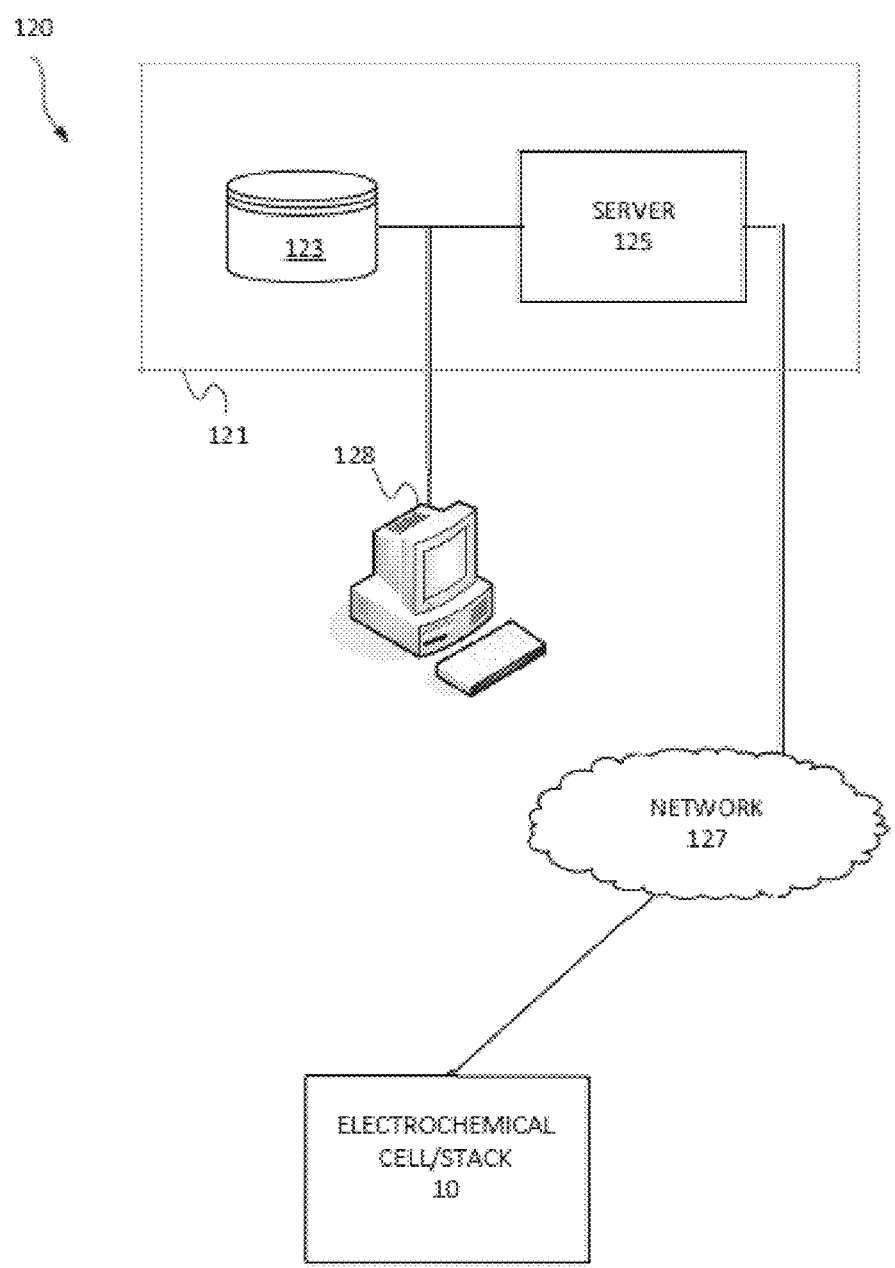
FIG. 5 depicts an example communication system between an electrolytic stack and a computing device having a controller over a connected network.

FIG. 5 illustrates an exemplary system 120 for controlling operation of an electrochemical cell or stack (e.g., including monitoring or controlling the operational voltage of a cell, plurality of cells in the stack, or the entire stack). The system 120 includes the electrochemical cell/stack 10 (such as depicted in FIG. 3), a monitoring system 121, a workstation 128, and a network 127. Additional, different, or fewer components may be provided.

In this system 120, one or more voltage sensors or monitors associated with the electrochemical cell/stack 10 may monitor the operating voltage of the cell/stack 10 and transmit the operating voltage information to the monitoring system 121 over the connected network.

The monitoring system 121 includes a server 125 and a database 123. The monitoring system 121 may include computer systems and networks of a system operator (e.g., the operator of the electrochemical cell/stack 10). The server database 123 may be configured to store information regarding the operating conditions or setpoints for optimizing the performance of the electrochemical cell/stack 10.

The monitoring system 121, the workstation 128, and the electrochemical cell/stack 10 are coupled with the network 127. The phrase "coupled with" is defined to mean directly connected to or indirectly connected through one or more intermediate components. Such intermediate components may include hardware and/or software-based components.

The optional workstation 128 may be a general-purpose computer including programming specialized for providing input to the server 125. For example, the workstation 128 may provide settings for the server 125. The workstation 128 may include at least a memory, a processor, and a communication interface.

Figure 6:
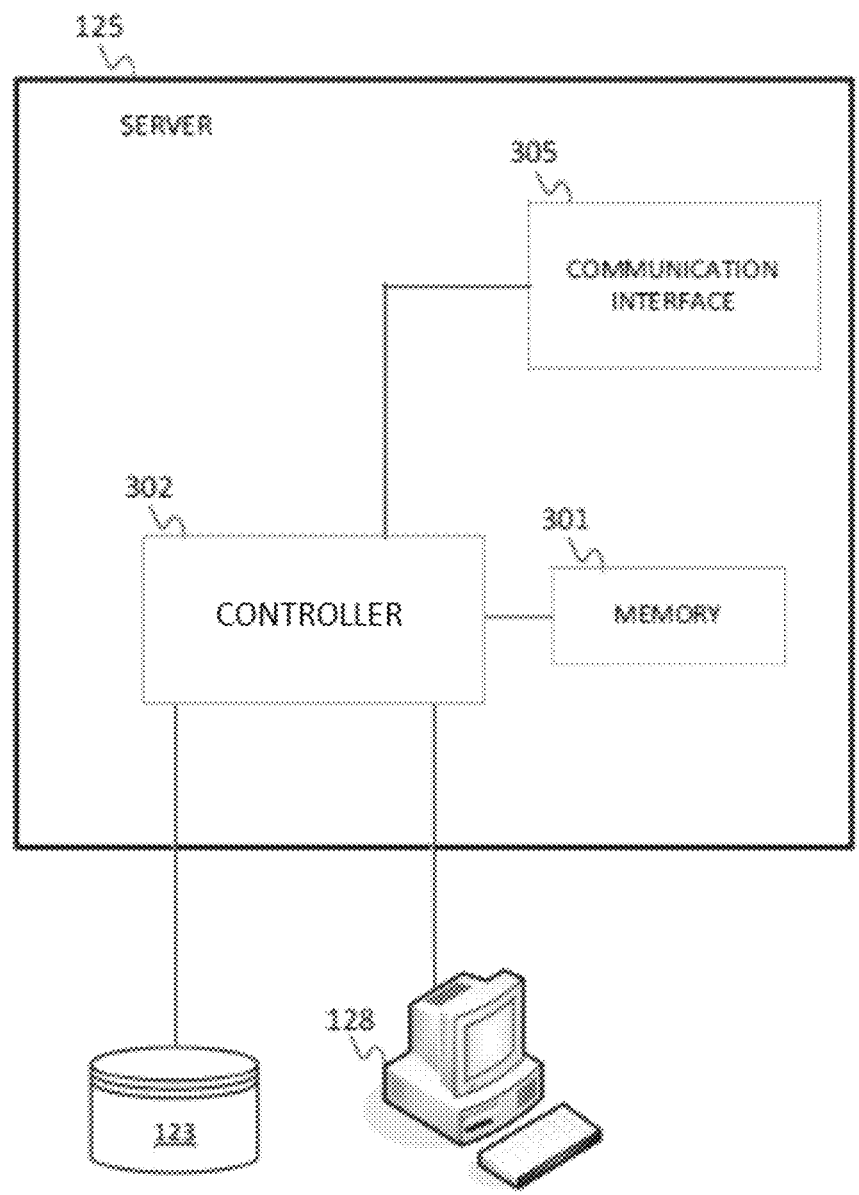
FIG. 6 depicts an example of a computing device having a controller.

FIG. 6 illustrates an exemplary server 125 of the system of FIG. 5. The server 125 includes a memory 301, a controller or processor 302, and a communication interface 305. The server 125 may be coupled to a database 123 and a workstation 128. The workstation 128 may be used as an input device for the server 125. The communication interface 305 receives data indicative of use inputs made via the workstation 128 or a separate electronic device.

The controller or processor 302 may include a general processor, digital signal processor, an application specific integrated circuit (ASIC), field programmable gate array (FPGA), analog circuit, digital circuit, combinations thereof, or other now known or later developed processor. The controller or processor 302 may be a single device or combination of devices, such as associated with a network, distributed processing, or cloud computing.

The controller or processor 302 may also be configured to cause the electrochemical cell or stack to perform one or more of the method acts described herein. For example, the controller or processor 302 may be configured to receive measured operating voltages from the one or more voltage sensors/monitors of the electrochemical cell/stack over a period of time. The processor or controller may then calculate or determine a change in voltage over time (dV/dt) within the cell, a group of cells, or all of the cells in the electrochemical stack from the received operating voltages. As noted above, the period of time between voltage measurements for the dV/dt calculation may be predefined for a specific period of time, e.g., 1 minute, 5 minutes, 10 minutes, 15 minutes, 30 minutes, 1 hour, 2 hours, etc. Alternatively, an operator of the electrochemical system may view the voltage data collected and select (e.g., enter via an input device of the electrochemical system) a specific time period for analysis by the controller or processor. In this particular case, the controller or processor may additionally receive input information from the operator on a specific time window to calculate the dV/dt value(s) for a specific cell, group of cells, or entire stack.

The controller or processor 302 may further be configured to compare the calculated dV/dt with a predefined threshold dV/dt value. As noted above, the threshold value may be determined or predefined from a specification, design, or expected performance of the electrolytic cell or stack over a period of time. Based on this comparison, the controller or processor 302 may be configured to identify a potential operational problem with the cell/stack when the calculated dV/dt is equal to or greater than the predefined threshold value.

In such an instance, following the identification of the operational problem, the controller/processor may provide an alert signal or message to the operator of the potential issue. In some cases, the controller/processor would then await further input from the operator on whether to take action and address the dV/dt issue. Alternatively, the controller/processor may automatically trigger an intervention, wherein the system may be instructed to conduct a cleaning of the membrane(s) of the cell/stack to remove any buildup of metal ions at the membrane(s) at a specified period of time.

The controller/processor may automatically (or via instruction from the operator) provide an instruction to inject a cleaning agent/composition into the water steam to assist in removing the buildup of metal ions at the membrane. As noted above, this injection instruction may be conducted in situ, e.g., while the electrochemical cell/stack continues to operate or during a startup or shutdown of the cell/stack system.

In some examples, the controller/processor may provide instructions to inject a specific volume of the cleaning composition based on the identified dV/dt issue. The amount of cleaning composition may be based on how high the dV/dt is over the threshold value, or it may be a predetermined volume regardless of the value of the calculated dV/dt.

In certain examples, the controller/processor may continue to receive and analyze additional voltage readings from the cell/stack to determine if the operational problem has been alleviated (e.g., if the operational dV/dt has been reduced below the threshold value to an expected operational value for the cell/stack). To the extent the operational problem remains present, a further cleaning sequence may be initiated. This process could continue until the measured voltage and calculated dV/dt are at an acceptable level.

The memory 301 may be a volatile memory or a non-volatile memory. The memory 301 may include one or more of a read only memory (ROM), random access memory (RAM), a flash memory, an electronic erasable program read only memory (EEPROM), or other type of memory. The memory 301 may be removable from the device 122, such as a secure digital (SD) memory card.

The communication interface 305 may include any operable connection. An operable connection may be one in which signals, physical communications, and/or logical communications may be sent and/or received. An operable connection may include a physical interface, an electrical interface, and/or a data interface. The communication interface 305 provides for wireless and/or wired communications in any now known or later developed format.

In the above-described examples, the network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting example, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative example, dedicated hardware implementations, such as application specific integrated circuits, programmable logic arrays and other hardware devices, can be constructed to implement one or more of the methods described herein. Applications that may include the apparatus and systems of various examples can broadly include a variety of electronic and computer systems. One or more examples described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

Although the present specification describes components and functions that may be implemented in particular embodiments with reference to particular standards and protocols, the claim scope is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having similar functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory (ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., E PROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube), LCD (liquid crystal display), or LED (light emitting diode) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server may be remote from each other and may interact through a communication network. The relationship of client and server arises by virtue of computer programs running on the respective computers and having a client-server relationship with each other.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

As used herein, the singular forms "a," "an," and "the" include plural referents unless the context clearly dictates otherwise.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

The Abstract of the Disclosure is provided to comply with 37 C.F.R. § 1.72 (b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the disclosure. The claims should not be read as limited to the described order or elements unless stated to that effect. Therefore, all embodiments that come within the scope and spirit of the following claims and equivalents thereto are claimed as the disclosure.

The invention claimed is:

1. A method of monitoring an operational performance of membranes of a plurality of electrochemical cells within an electrochemical stack, the method comprising:

measuring, by a plurality of sensors, first operational voltages of the plurality of electrochemical cells at a first time;

measuring, by the plurality of sensors, second operational voltages of the plurality of electrochemical cells at a second time;

calculating, by a processor, an average change in an overall operational voltage of the plurality of electrochemical cells over a period of time defined by a difference between the first operational voltages and the second operational voltages divided by a difference between the first time and the second time, wherein the calculation of the average change is a weighted average in which at least one sensor of the plurality of sensors is provided a higher weight than another sensor of the plurality of sensors based on a measurement location of the at least one sensor within the electrochemical stack;

comparing, by the processor, the average change in the overall operational voltage to a threshold value;

adding a cleaning composition only to an inlet water stream that is supplied to an anodic inlet of the electrochemical stack for an electrolysis reaction to remove metal ions at the membranes of the plurality of electrochemical cells within the electrochemical stack when the average change in the overall operational voltage equals or exceeds the threshold value, wherein the adding is performed in situ during operation of the electrochemical stack comprising operating conditions for carrying out the electrolysis reaction, and wherein the cleaning composition comprises an acidic composition having a pH that does not leach other metals into the inlet water stream;

reacting the cleaning composition with the metal ions at the membranes of the plurality of electrochemical cells during the operation of the electrochemical stack to form an acidic-metal compound; and transferring a product of the electrolysis reaction of the cleaning composition and the metal ions from the membranes and the plurality of electrochemical cells, therein removing at least a portion of the metal ions from the membranes of the plurality of electrochemical cells during the operation of the electrochemical stack.

2. The method of claim 1, wherein the cleaning composition is automatically added following a notification by the processor that the average change in the overall operational voltage equals or exceeds the threshold value.

3. The method of claim 1, wherein the cleaning composition is added following receipt, by the processor, of instructions input by an operator to clean the membranes of the plurality of electrochemical cells.

4. The method of claim 1, wherein the acidic composition comprises citric acid.

5. The method of claim 1, wherein the acidic composition has a pH in a range of 3-5.

6. The method of claim 1, further comprising, following the adding, the reacting, and the transferring:

conducting an on-going iterative process during the operation of the electrochemical stack, wherein the iterative process comprises:

repeating the measuring of the first operational voltages, the measuring of the second operational voltages, the calculating of the average change in the overall operational voltage, and the comparing of the average change in the overall operational voltage to determine whether the overall operational voltage is equal to or greater than the threshold value; and conducting the adding, the reacting, and the transferring again when the average change in the overall operational voltage is equal to or greater than the threshold value.

7. The method of claim 6, wherein the iterative process is repeated immediately following the adding, the reacting, and the transferring to determine whether or not the cleaning composition has reduced the average change in the overall operational voltage below the threshold value.

8. The method of claim 6, wherein the iterative process is repeated at a predefined period of time following the adding, the reacting, and the transferring.

9. An electrochemical system comprising:
an electrochemical stack having a plurality of electrochemical cells;
a plurality of sensors configured to measure first operational voltages of respective electrochemical cells of the plurality of electrochemical cells at a first time and measure second operational voltages of the respective electrochemical cells at a second time; and
a processor configured to:
receive the first operational voltages at the first time and the second operational voltages at the second time from the plurality of sensors;
calculate an average change in an overall operational voltage of the respective electrochemical cells of the plurality of electrochemical cells over a period of time defined by a difference between the first operational voltages and the second operational voltages divided by a difference between the first time and the second time, wherein the calculation of the average change is a weighted average in which at least one sensor of the plurality of sensors is provided a higher weight than another sensor of the plurality of sensors based on a measurement location of the at least one sensor within the electrochemical stack;
compare the average change in the overall operational voltage to a threshold value; and
provide an instruction to add a cleaning composition only to an inlet water stream that is supplied to an anodic inlet of the electrochemical stack for an electrolysis reaction to remove metal ions at membranes of the plurality of electrochemical cells of the electrochemical stack when the average change in the overall operational voltage equals or exceeds the threshold value, wherein addition of the cleaning composition is performed in situ during operation of the electrochemical stack comprising operating conditions for carrying out the electrolysis reaction, wherein the cleaning composition comprises an acidic composition having a pH that does not leach other metals into the inlet water stream, and wherein the cleaning composition is configured to react with the metal ions at the membranes to form an acidic-metal compound.

10. The electrochemical system of claim 9, wherein the cleaning composition is automatically added following a notification from the processor that the average change in the overall operational voltage equals or exceeds the threshold value.

11. The electrochemical system of claim 9, wherein the processor is further configured to:
receive an input by an operator to add the cleaning composition to clean the plurality of electrochemical cells of the electrochemical stack.

12. The electrochemical system of claim 9, wherein the acidic composition comprises citric acid.

13. The electrochemical system of claim 9, wherein the acidic composition has a pH in a range of 3-5.

14. The electrochemical system of claim 9, wherein, following an addition of the cleaning composition, the processor is further configured to:
iteratively repeat the measurement of the first operational voltages, the measurement of the second operational voltages, the calculation of the average change in the overall operational voltage, and the comparison of the average change in the overall operational voltage during the operation of the electrochemical stack to determine whether the overall operational voltage is equal to or greater than the threshold value; and
provide an additional instruction to add additional cleaning composition when the average change in the overall operational voltage is equal to or greater than the threshold value.

* * * * *